Apr. 17, 1923.

Re. 15,578

W. S. HARLEY

COMBINED ENGINE SHAFT, CLUTCH, AND TRANSMISSION

Original Filed Sept. 19, 1917 3 sheets-sheet 1

Inventor:
William S. Harley.

By Edwin B. H. Tower Jr. Atty.

Apr. 17, 1923. Re. 15,578
W. S. HARLEY
COMBINED ENGINE SHAFT, CLUTCH, AND TRANSMISSION
Original Filed Sept. 19, 1917 3 sheets-sheet 2
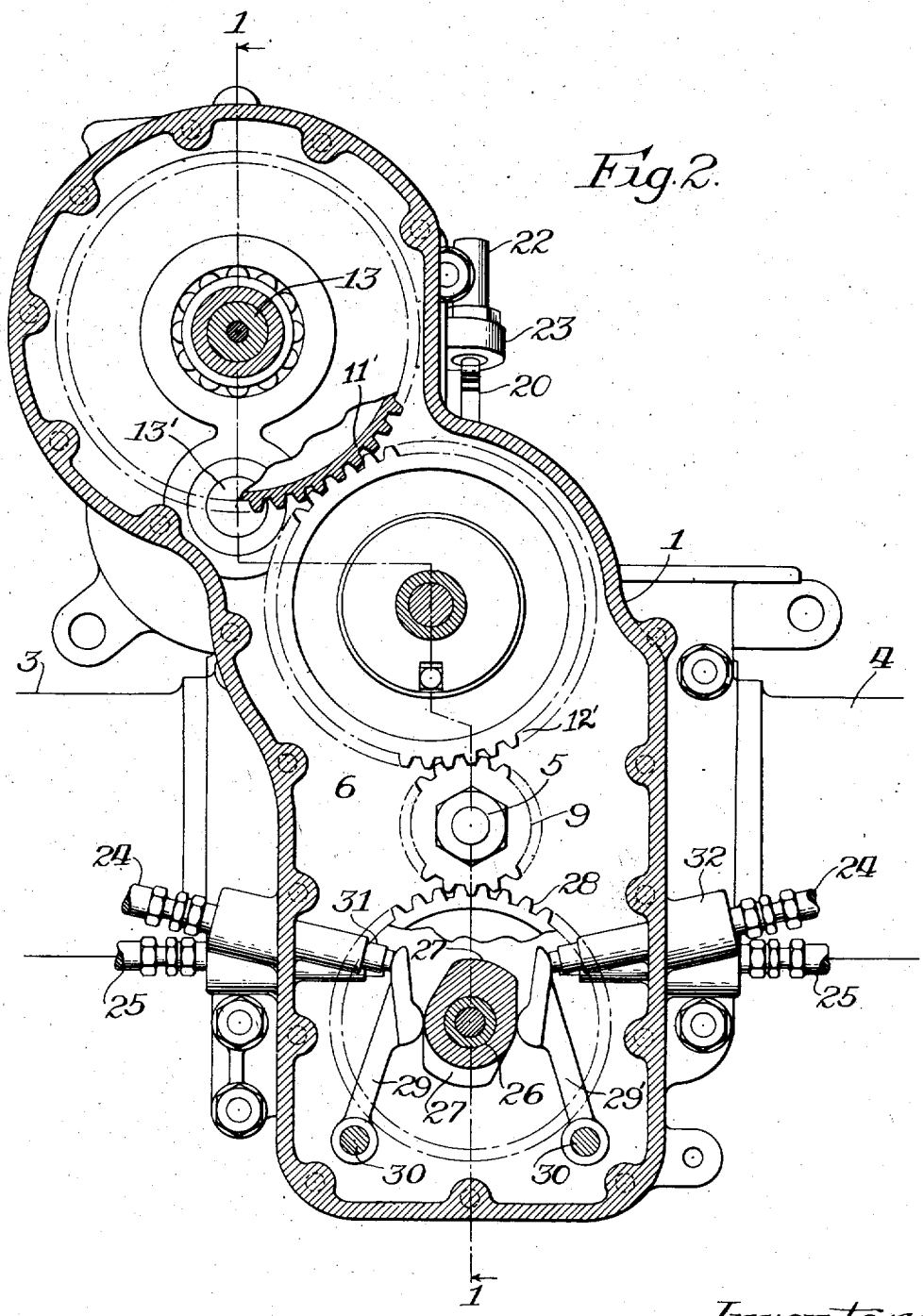
Inventor:
William S. Harley.
By Edwin B. H. Jones Jr. Atty Apr. 17, 1923. Re. 15,578

W. S. HARLEY

COMBINED ENGINE SHAFT, CLUTCH, AND TRANSMISSION

Original Filed Sept. 19, 1917 3 sheets-sheet 3

Inventor:
William S. Harley.

By Edwin B. H. Iwer, Jr. Atty.

Reissued Apr. 17, 1923. Re. 15,578

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

COMBINED ENGINE SHAFT, CLUTCH, AND TRANSMISSION.

Original No. 1,360,110, dated November 23, 1920, Serial No. 192,117, filed September 19, 1917. Application for reissue November 23. 1922. Serial No. 602,958.

*To all whom it may concern:*

Be it known that I, WILLIAM S. HARLEY, a citizen of the United States, residing at Milwaukee, in the county of Milwaukee and State of Wisconsin, have invented new and useful Improvements in Combined Engine Shafts, Clutches, and Transmissions, of which the following is a specification.

This invention relates to power transmission mechanism.

The power transmission mechanism to which this invention particularly relates comprises a combined engine crank shaft, clutch and change speed gear transmission.

Among the objects of this invention is to provide a unitary power transmission having a combined engine crank shaft, clutch and change speed gear transmission which are strong, compact and durable.

Another object is to provide unitary power transmission mechanism which may be readily applied to a motorcycle.

Another object is to provide power transmission mechanism, whereof the engine crank shaft and the change speed gear transmission are enclosed, and the clutch and the gears for driving the clutch from the engine crank shaft are readily accessible.

Another object is to provide driving mechanism between the engine crank shaft and the transmission drive shaft which is durable and efficient and which will not require adjustment.

Other objects and advantages will hereinafter appear.

In accordance with this invention, the engine crank shaft, change speed gear transmission and clutch are combined into a unitary construction, and the engine crank shaft and the change speed gear transmission are enclosed in a casing.

The clutch and drive gears are arranged on the outside of the casings of the transmission and crank shafts so as to be readily accessible.

The power is transmitted from the crank shaft through suitable gears to a clutch and thence to the change speed gear transmission from which the drive wheel of the motorcycle or other vehicle is driven.

In order to more particularly set forth the invention and a way in which it may be embodied, the combined engine crank shaft, clutch and change speed gear transmission illustrated in the accompanying drawings will be explained.

Fig. 2 is a vertical section on the line 2—2 of Fig. 1.

Figure 1:
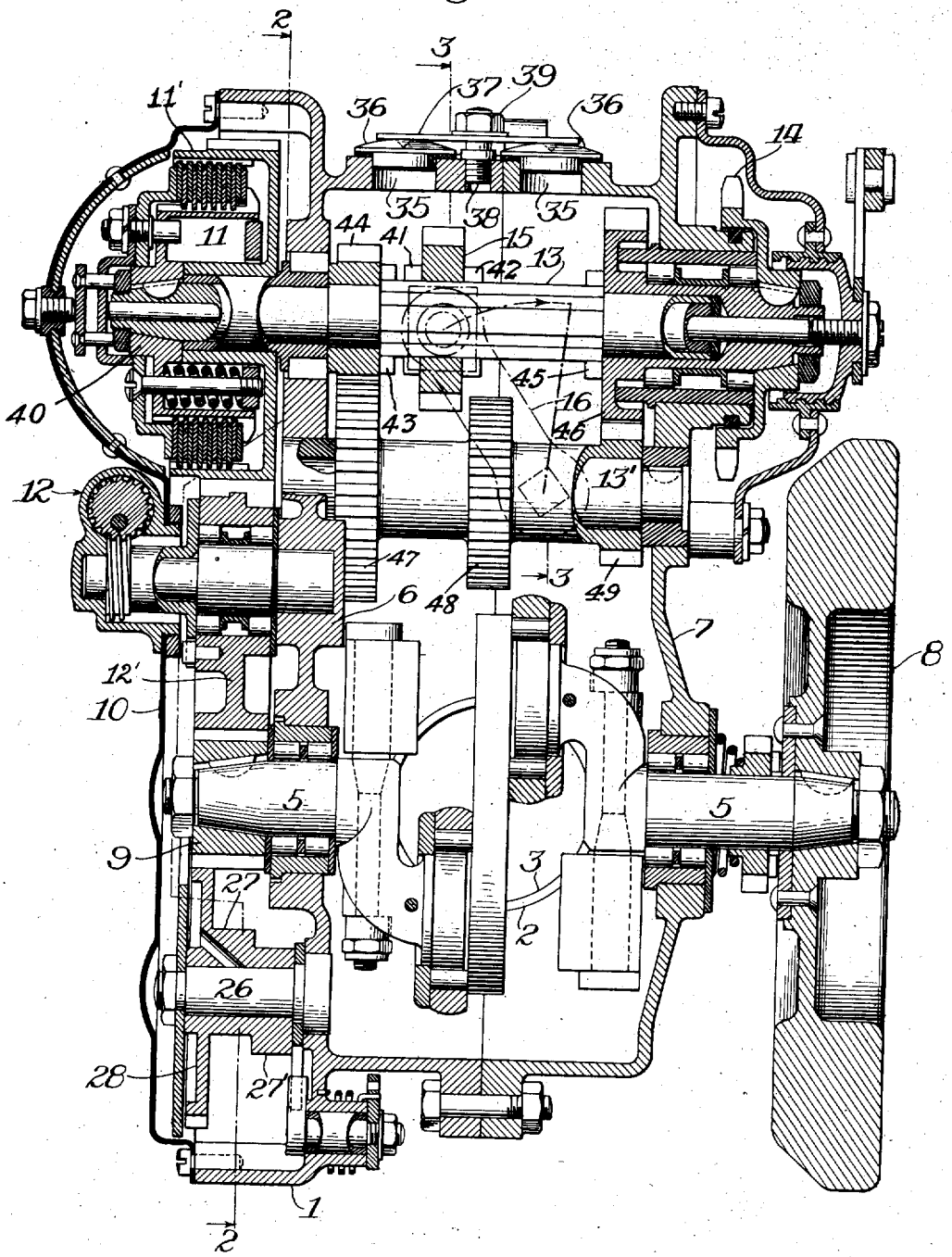
Fig. 1 is a vertical transverse section through a combined engine crank shaft, clutch and transmission.

The power transmission mechanism is shown as comprising an engine shaft 5, a transmission drive shaft 13 and countershaft 13′ carrying selective change speed gears, and a clutch 11 on the transmission drive shaft driven by the engine crank shaft by gears 9, 12′ and 11′.

The engine crank shaft 5 and the change speed transmission are enclosed in a casing. The transmission and crank casing may be formed integrally or it may be formed in separate parts and suitably secured together.

The clutch 11 is mounted on the transmission drive shaft 13 externally of the casing where it is readily accessible for inspection and adjustment. The casing has a centrally arranged circular opening 2 in each opposite side wall substantially intermediate the ends, these openings receiving the inner ends of horizontally positioned opposed engine cylinders 3 and 4 in which pistons (not shown) are designed to reciprocate. The engine crank shaft 5 to which the pistons are connected, has the straight portions thereof journally mounted in the side walls 6 and 7 of the crank case 1.

The specific construction of the crank shaft forms the subject matter of Patent 1,263,407, granted April 23, 1918.

Both ends of the engine shaft extend outwardly of the crank case, one being provided with a fly wheel 8 and the other with a spur gear 9.

The gear 9 is disposed in engagement with the outer side of the wall 6, the latter, together with a crank case cover 10 forming a gear case to house the multiple disc clutch 11, and a train of gears.

The driving member of the clutch 11 is provided with a gear wheel 11′ housing the clutch and forming with the gear 9, and an intermediate gear 12′, a gear train for driving the shaft 13 from the engine shaft 5.

One of the units of the train of gears operates an oiler 12 which is constructed in accordance with Patent 1,254,799 granted January 29th, 1918.

A sprocket wheel 14 connected with the end of the drive shaft 13 on the opposite side of the transmission case from the clutch 11 is adapted to have a sprocket chain trained thereover and around the sprocket on the rear wheel of a motorcycle upon which the power plant is mounted.

The clutch 11 disengages the drive shaft 13 from the engine shaft 5 to allow a suitable gear 15 of the selective speed transmission to be engaged with any one of three other gears so as to change the speed ratio between the engine shaft and the motorcycle drive wheel, or to be moved into neutral position.

The clutch member 11 is provided with two sets of inter-engaging discs, one set extending inwardly from the gear wheel 11′ and the other set extending outwardly from the hub 40 carried by the shaft 13, the discs of one set alternating with those of the other whereby when the discs are pressed into engagement the drive shaft 13 will be driven by the engine shaft 5.

The sliding gear 15 splined upon the shaft 13 is preferably moved by means of a shifting arm 16 connected with one end of a rock shaft 17 extending through a wall of the gear case. The gear 15 is provided with clutch faces 41 and 42 on the opposite sides thereof for engagement with the clutch 43 of the low speed gear 44 when moved to the left and with the clutch 45 of the gear 46 when moved to the right. Gears 44 and 46 are mounted on the shaft 13 for rotation independently thereof. A low speed driven gear 47 mounted on the counter shaft meshes with the low speed gear 44 and is driven thereby. An intermediate speed driven gear 48 fixed on the shaft 13′ is engaged and driven by the sliding gear 15 when moved to its mid position.

A fixed gear 49 also mounted on the shaft 13′ transmits the movement of the gears 47 and 48 to the gear 46. The sprocket wheel 14 is secured to rotate with the gear 46.

When the sliding gear 15 is in neutral position the traction wheel is disconnected from the engine The sliding gear 15 when moved to the left drives the low speed gears 44 and 47 and when moved to the right engages with the gear 48 and drives the traction wheel at an intermediate speed.

If the gear 15 be moved farther to the right it engages the gear 46 and forms the high speed driving connection.

The shaft 17 for shifting the gear 15 is rocked by a lever (not shown) mounted in a suitable position on the motorcycle frame and connected through a rod 18 with an arm 19 keyed on the rock shaft 17. Also fixed on the rock shaft and forming a part of the arm 19 is a latch plate 20 provided with four ratchet notches into any one of which a spring plunger 21 is movable.

Figure 4:
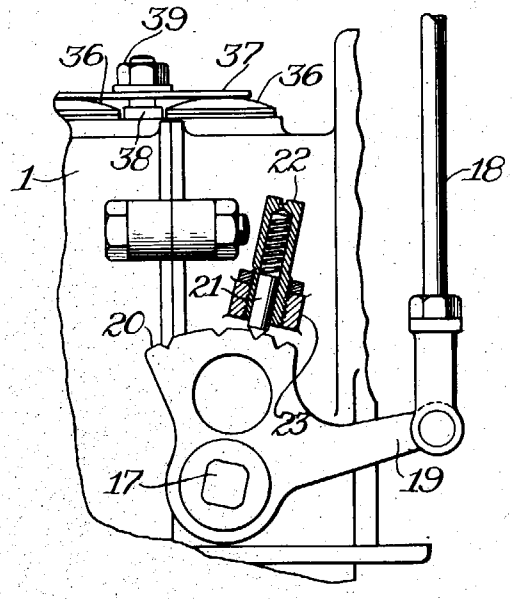
Fig. 4 is a detail elevational view showing the means for holding the shiftable gear of the selective speed transmission mechanism in any one of its four positions.
Figure 3:
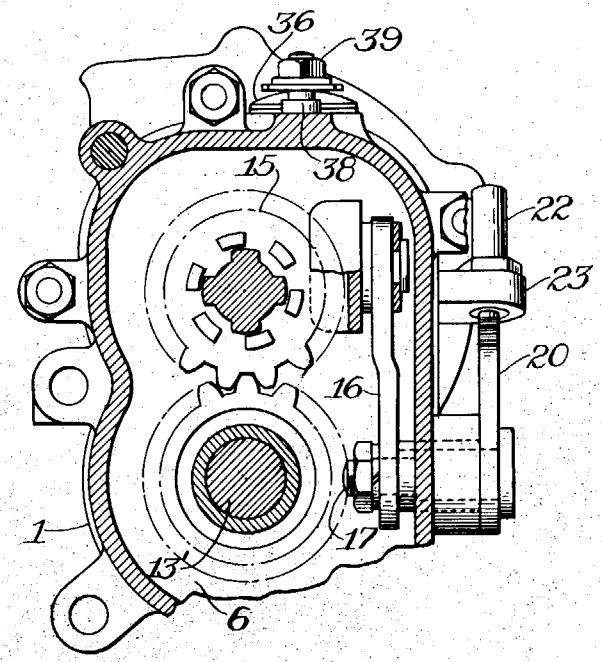
Fig. 3 is a similar view on the plane of the line 3—3 of Fig. 1.

The plunger is mounted in a suitable housing 22 carried by an ear 23 cast upon the outside of the transmission casing. As the parts are shown in Figs. 1 and 4, the sliding gear 15 is in a neutral position and the plunger 21 in one of the notches of the plate 20 where it will remain until the arm 19 is forcibly moved.

Each of the cylinders 3 and 4 is provided with an intake and an exhaust valve which include the stems 24 and 25 respectively. For operating these valves at the proper time a cam shaft 26 is mounted in the gear casing and provided with a pair of cams 27 and 27′.

The cam shaft has a gear 28 secured thereto meshing with the gear 9 whereby it is continuously rotated by the engine shaft 5.

Also disposed within the gear casing are two pairs of levers 29 and 29′, one pair being disposed on each side of the cam shaft and pivoted at one end therebelow by pins 30.

The free ends of the levers are disposed upwardly as shown in Fig. 2 and engage with the inner ends of push rods 31 which extend through bearings 32 formed in the front and rear walls of the gear casing; the push rods serving their usual purpose of actuating the valve stems by engagement with the inner ends thereof. The cams 27 and 27′ alternately act upon the levers 29 and 29′, intermediate their ends.

Thus the levers 29 and 29′ readily allow the cams 27 and 27′ to actuate the valve stems 24 and 25 without the cams being of excessive size.

The addition of the levers allows a very compact arrangement which is essential in engines of the type illustrated.

The valve actuating mechanism forms the subject matter of Patent 1,301,256, granted April 22, 1919.

Access to the transmission case 1 for the purpose of adding oil or the like thereto is provided through a pair of inlet openings 35 in the top of the transmission casing. These openings are normally closed by a pair of flanged plugs 36, connected together by a spring plate 37. The intermediate portion of the plate is apertured to receive a post 38 threaded into the crank case. A nut 39 on the outer end of the post allows the tension of the spring plate to be readily regulated and varied whereby the plugs 36 are held tightly in place.

The invention contained herein is, of course, susceptible of other emobdiments and adaptations.

I claim:

1. In a machine of the class described comprising in combination, a vertically elongated crank case having a pair of alined cylinder openings in its opposite walls at its lower end, a horizontally positioned cylinder carried in each of said openings, a horizontal engine shaft disposed in the lower end of the crank case transversely thereof and having its opposite ends journaled in the opposite side walls, a drive gear on one end of the engine shaft externally of the crank case and adjacent one side thereof, a peripheral flange extending from each of the last mentioned sides of the crank case and disposed laterally of the face thereof, a drive shaft disposed in the upper end of the crank case transversely thereof and having its opposite ends journaled in the opposite side walls, said ends being extended externally of the crank case, a counter shaft in the upper portion of the crank case between the engine shaft and the drive shaft and parallel thereto, the ends of said counter shaft being journaled in the opposite side walls of the case, a clutch on the drive shaft externally of the crank case and on the side thereof adjacent said drive gear, a gear train connecting the drive gear and clutch, a cover disposed over the last mentioned elements and having an oil tight engagement with the outer edge of said peripheral flange to form a gear case, selective speed means on said drive and counter shafts, and a driven member on the end of the drive shaft opposite the clutch and externally of the crank case.

2. A combined engine shaft, clutch and transmission for motor cycles comprising a crank case, an engine shaft journaled therein and having a comparatively short end portion extending therefrom, a drive gear on said extending end portion, a transmission drive shaft parallel to the engine shaft having a clutch on one end thereof provided with gear teeth on its outer periphery, a sprocket wheel on the opposite end thereof having different speed ratios with said drive shaft, and an intermediate gear between the drive gear and the clutch gear.

3. A combined engine shaft, clutch and transmission for motor cycles comprising an engine shaft, a drive shaft parallel thereto, a countershaft below said drive shaft, enclosing means for said shafts, a gear case secured to said enclosing means, one end of each of said shafts extending into the gear case, a drive gear on the engine shaft and a clutch on the drive shaft within said casing, said clutch being provided with a concentric gear member adapted to be driven by the drive gear.

4. A combined engine shaft, clutch and transmission for motor cycles comprising an engine shaft, a drive shaft parallel thereto, a counter shaft parallel to said drive shaft, selective speed gears on said drive and counter shafts, a drive gear on one end of the engine shaft, a clutch on one end of the drive shaft, a sprocket wheel on the opposite end thereof, the clutch and drive gear being in substantially the same plane and a gear driven by said drive gear housing the clutch.

5. A combined engine shaft, clutch and transmission for motor cycles comprising a casing, an engine shaft therein, a drive shaft and a counter shaft parallel and substantially co-extensive therewith, a sprocket wheel on the drive shaft, a train of gears arranged in the same plane for driving the drive shaft from the engine shaft, comprising a drive gear on the engine shaft and intermediate gear and a clutch member provided with outwardly extending gear teeth and a complementary clutch member carried by the drive shaft whereby the drive shaft is detachably connected to the engine shaft.

6. A combined engine shaft, clutch and transmission for motor vehicles comprising a crank case having a transversely extending engine shaft therein, one end of said engine shaft extending through a wall of said casing and provided with a drive gear on its outer end, a transmission drive shaft parallel to said engine shaft and substantially co-extensive therewith, a clutch member on one end of the drive shaft provided with a concentrically arranged gear member, an intermediate gear between the drive gear and the clutch gear, and a casing for housing said gears.

7. A combined engine shaft, clutch and transmission for motor cycles comprising an engine shaft, a drive shaft parallel thereto and substantially co-extensive therewith, a counter shaft parallel to said drive and engine shafts, enclosing means for said shafts, a gear case secured to said enclosing means, a gear train in said gear case including a gear on the engine shaft and a gear on the drive shaft, said gear on the drive shaft housing clutch mechanism for disconnecting the drive shaft from the gear train.

8. A combined engine shaft, clutch and transmission for motor cycles comprising a transmission drive shaft, a counter shaft parallel thereto and driven thereby, an engine shaft parallel to the drive and counter shafts and substantially co-extensive therewith, enclosing means for said shafts in which the shafts are journaled and through which the engine and drive shafts extend, a clutch connected to an outwardly extending end of the drive shaft and a gear on the outwardly extending end of the engine shaft for driving the drive shaft through the clutch.

9. A combined engine shaft, clutch and transmission for motor vehicles comprising a crank case, an engine shaft therein, a transmission drive shaft parallel to and co-extensive with said engine shaft, a clutch on one end of the drive shaft, a sprocket wheel on the other end thereof, a counter shaft parallel to said drive shaft, selective speed gears on the drive and counter shafts to drive the counter shaft at different speeds, and driving means between the counter shaft and the sprocket wheel.

10. A combined engine shaft, clutch and transmission, comprising a crank case, a horizontal engine shaft therein, a drive shaft parallel thereto, a counter shaft parallel to the drive shaft, selective gear mechanism on the drive and counter shafts, a clutch on one end of the drive shaft and a sprocket wheel on the other end thereof, and driving means between the engine shaft and clutch.

In witness whereof, I have hereunto subscribed my name.

WILLIAM S. HARLEY.